United States Patent [19]

Bhardwaj et al.

[11] Patent Number: 5,580,172
[45] Date of Patent: Dec. 3, 1996

[54] METHOD AND APPARATUS FOR PRODUCING A SURFACE TEMPERATURE MAP

[75] Inventors: Narender K. Bhardwaj, San Diego; Boris Glezer, Del Mar; Kenneth H. Maden, Coronado; Sheldon Smilo, San Diego, all of Calif.

[73] Assignee: Solar Turbines Incorporated, San Diego, Calif.

[21] Appl. No.: 321,369

[22] Filed: Oct. 11, 1994

[51] Int. Cl.$^6$ .............. G01K 11/12; G01K 3/00
[52] U.S. Cl. .............. 374/137; 374/162; 382/100
[58] Field of Search .............. 374/137, 162; 354/76; 382/100, 165

[56] References Cited

U.S. PATENT DOCUMENTS

| | | | |
|---|---|---|---|
| 3,533,399 | 10/1970 | Goldberg et al. | 374/137 |
| 3,635,085 | 1/1972 | Shimotsuma et al. | 374/137 |
| 3,718,757 | 2/1973 | Gulitz et al. | 374/137 |
| 4,457,603 | 7/1984 | Gebhart et al. | 374/162 |
| 4,797,555 | 1/1989 | La Mar | 374/161 |
| 4,885,633 | 12/1989 | Buck | 358/93 |
| 4,902,139 | 2/1990 | Adiutori | 374/137 |
| 5,135,795 | 8/1992 | Gregory et al. | 428/195 |
| 5,294,198 | 3/1994 | Schlagheck | 374/137 |

FOREIGN PATENT DOCUMENTS

| | | | |
|---|---|---|---|
| 0087928 | 7/1980 | Japan | 374/137 |
| 2044928 | 10/1980 | United Kingdom | 374/137 |

OTHER PUBLICATIONS

Measurement, vol. 13, No. 4, Jul. 1994, "Experimental tests on the behaviour of surface temperature indicators," F. Cascetta.

Review of Scientific Instruments, vol. 62, No. 3, Mar. 1, 1991, "A method to increase the sensitivity of temperature measurements of current-carrying microelectronic components," K. Friedrich et al.

*Primary Examiner*—Diego F. F. Gutierrez
*Attorney, Agent, or Firm*—Steven R. Janda; Alan J. Hickman; Larry G. Cain

[57] ABSTRACT

A method and apparatus are provided for producing a temperature profile of a part operating within a machine is provided. The machine is operated with the part for a predetermined period of time. The part is placed in a light box in which a camera produces an image of the part. The image is compared with a standard set of colors and the standard color most closely corresponding to each pixel of the image is selected.

16 Claims, 9 Drawing Sheets

Fig_1_
(PRIOR ART)
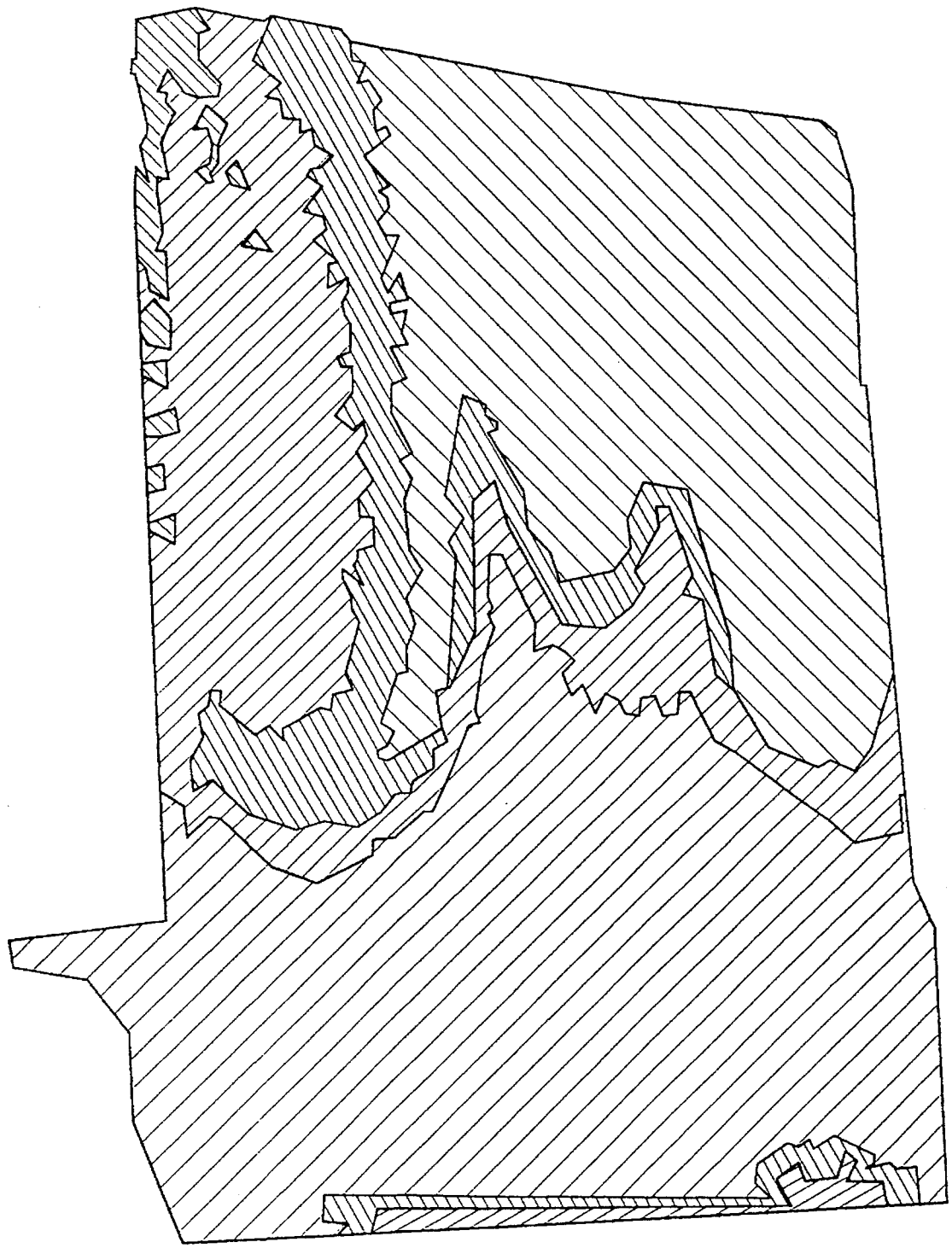

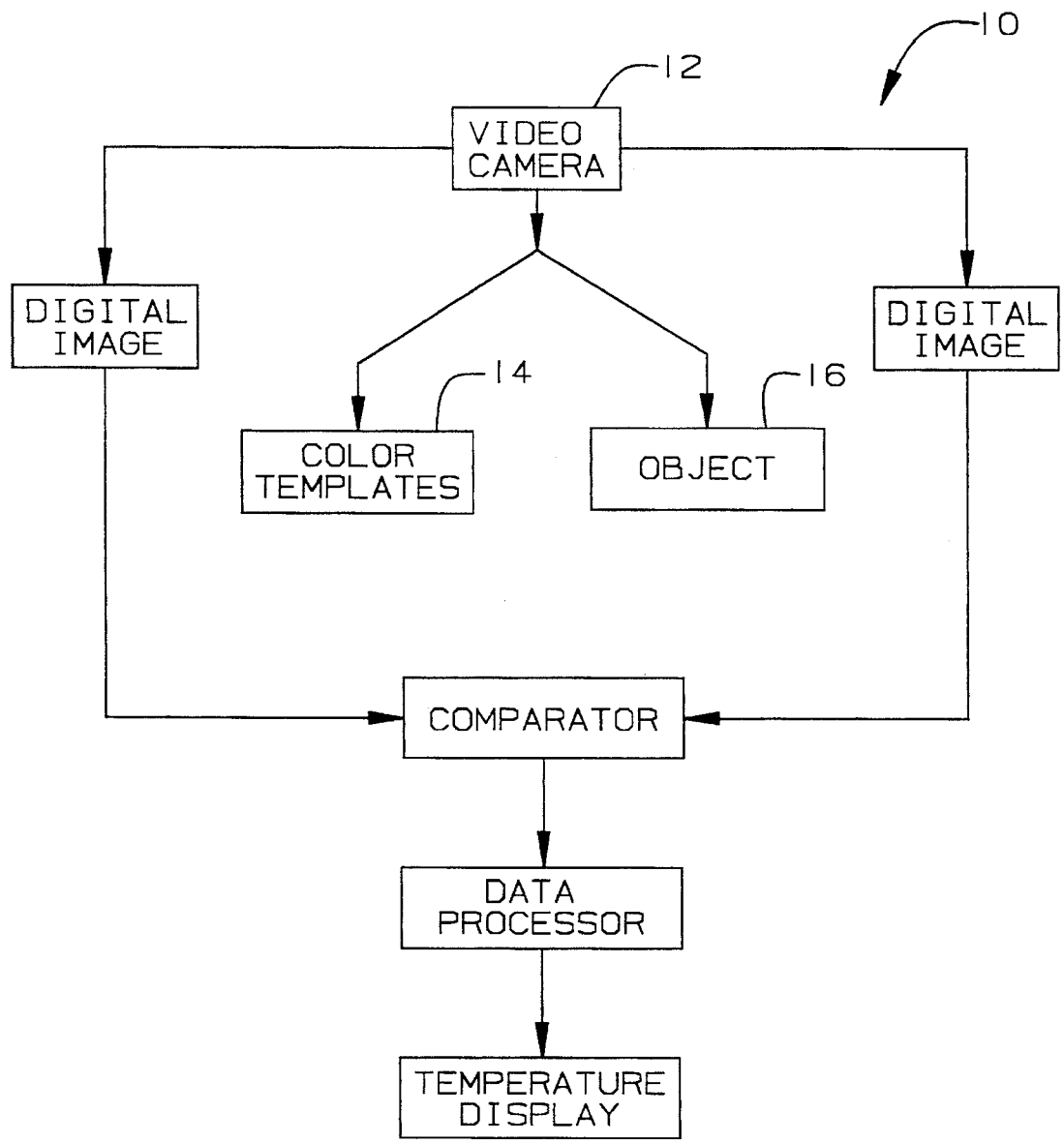

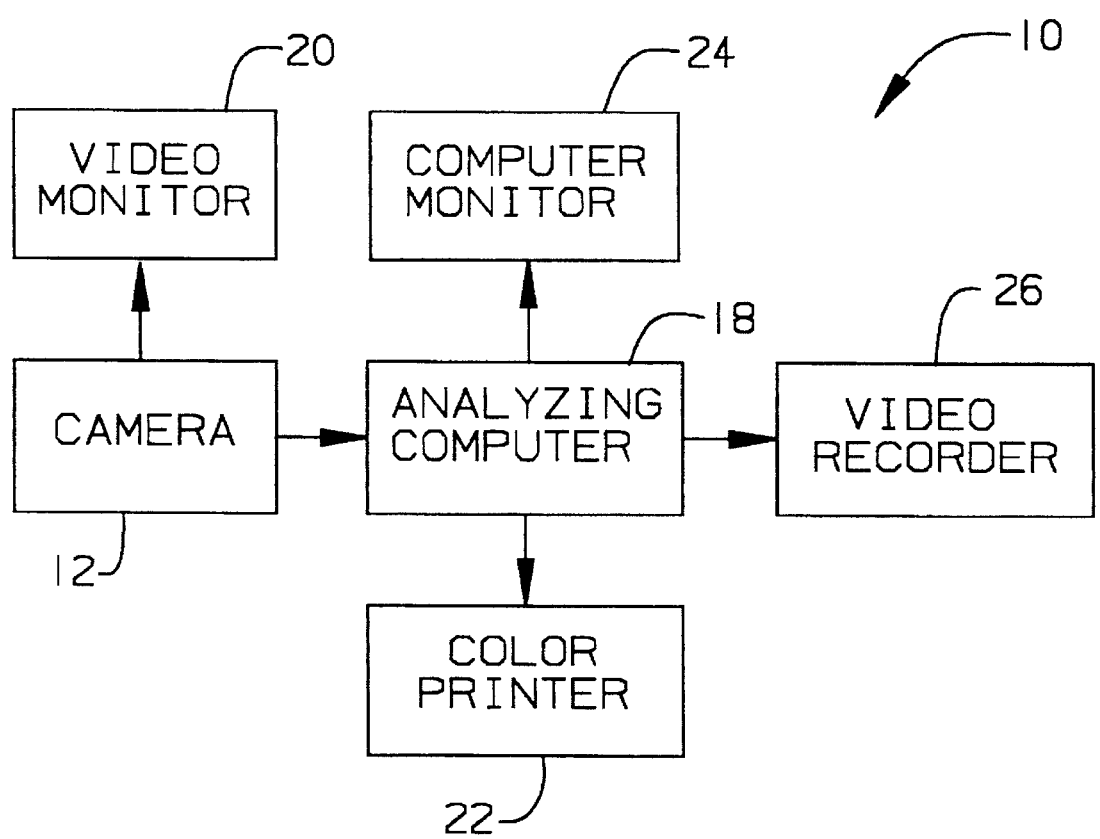

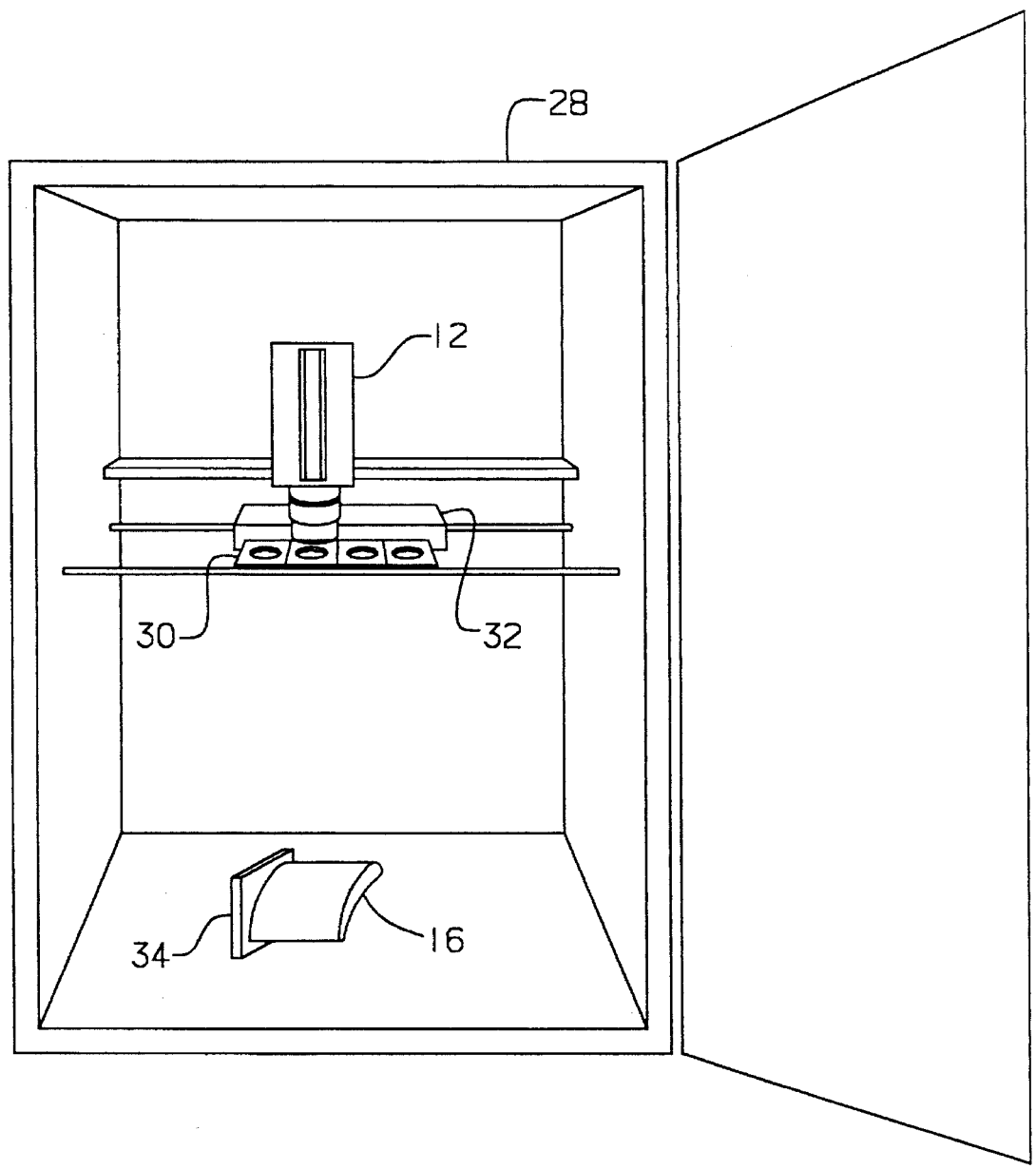
Fig_4

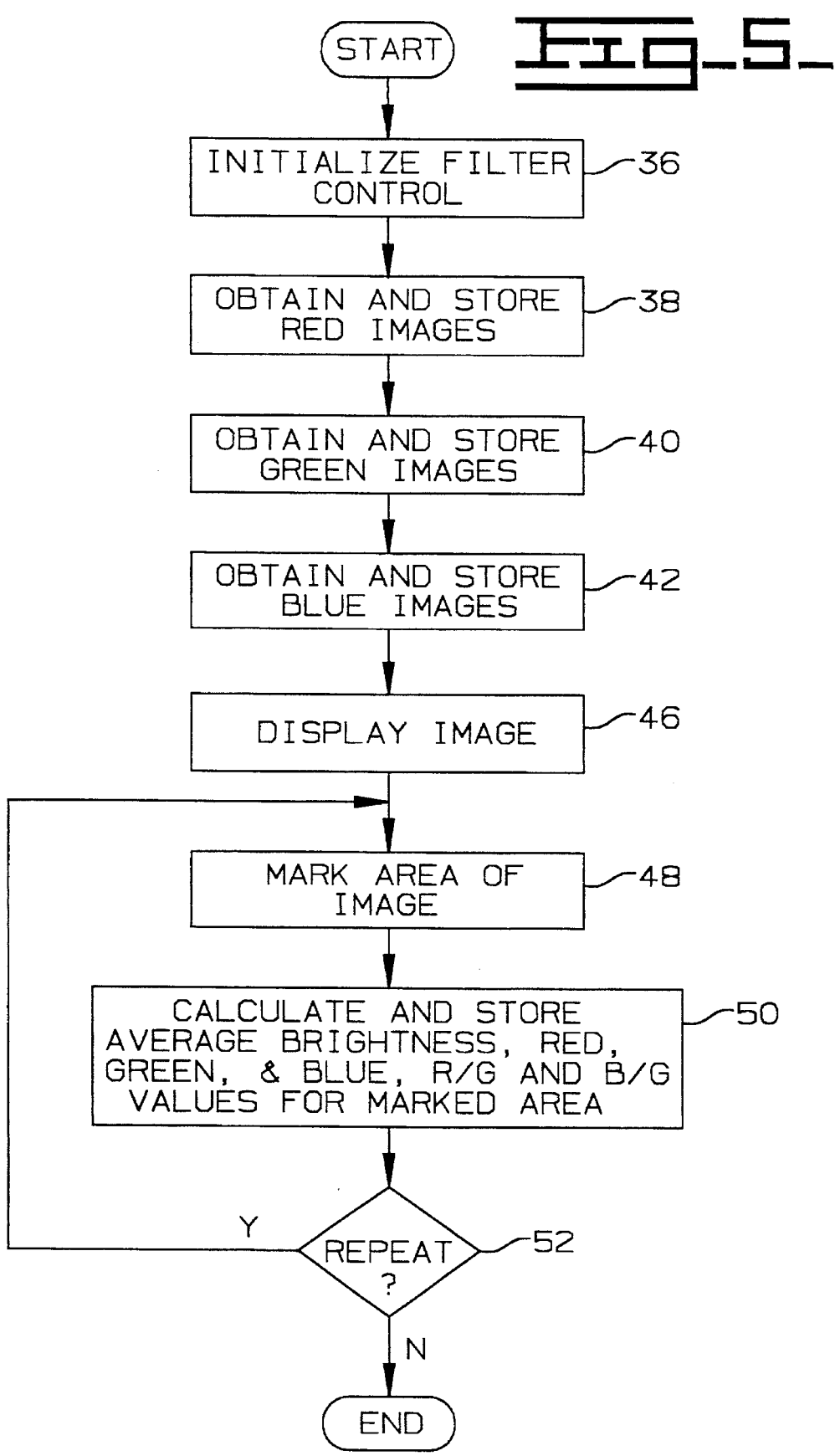

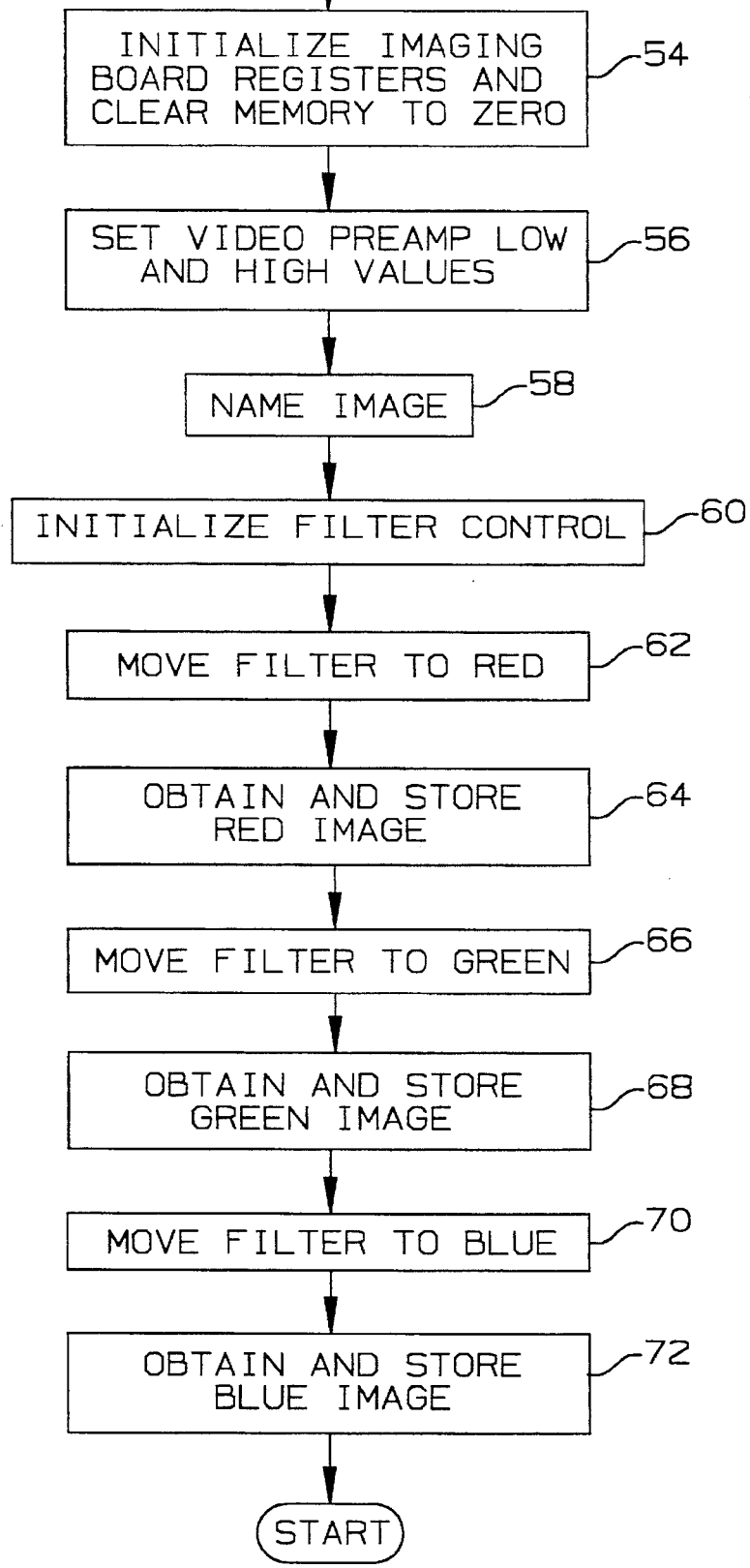

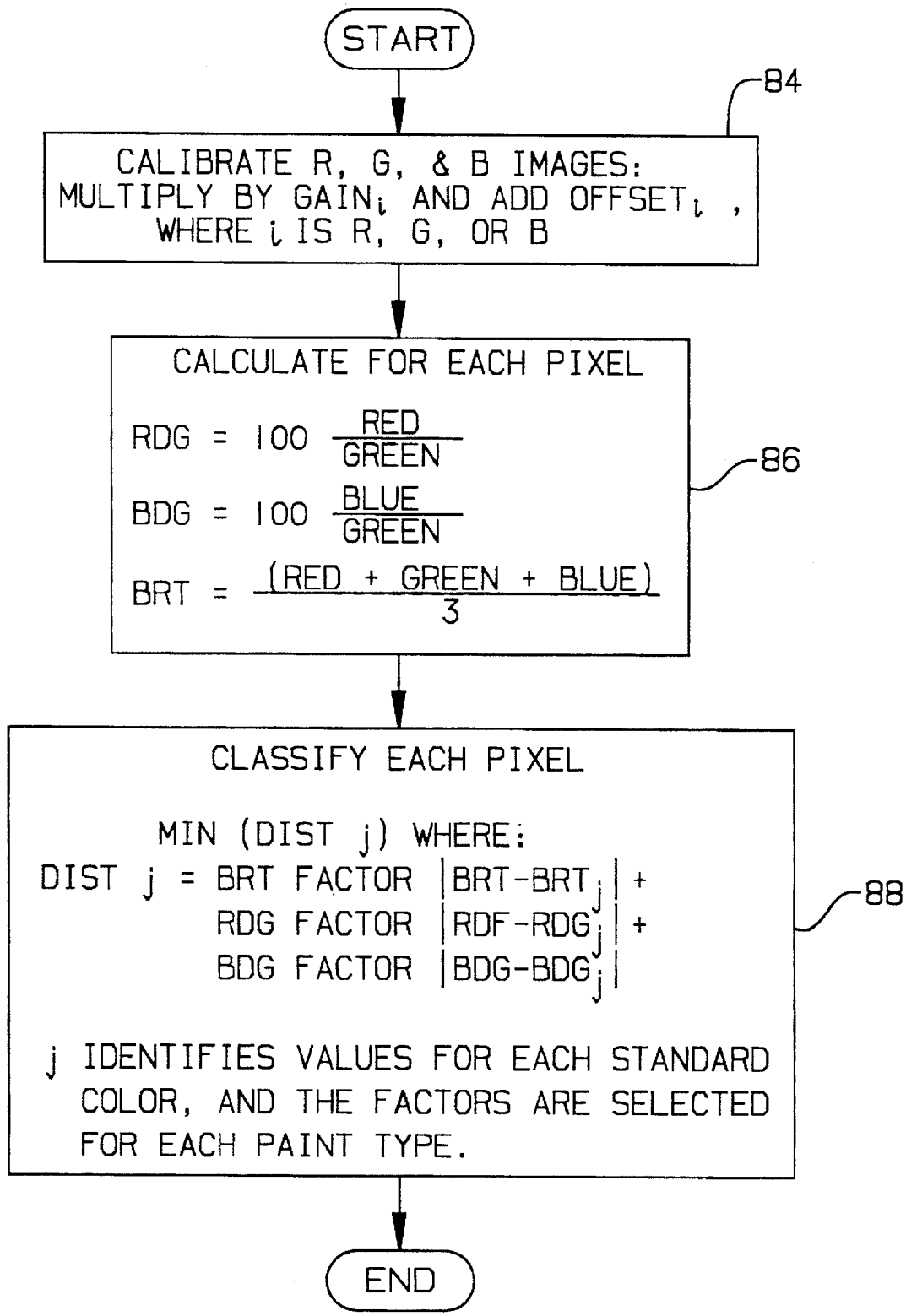

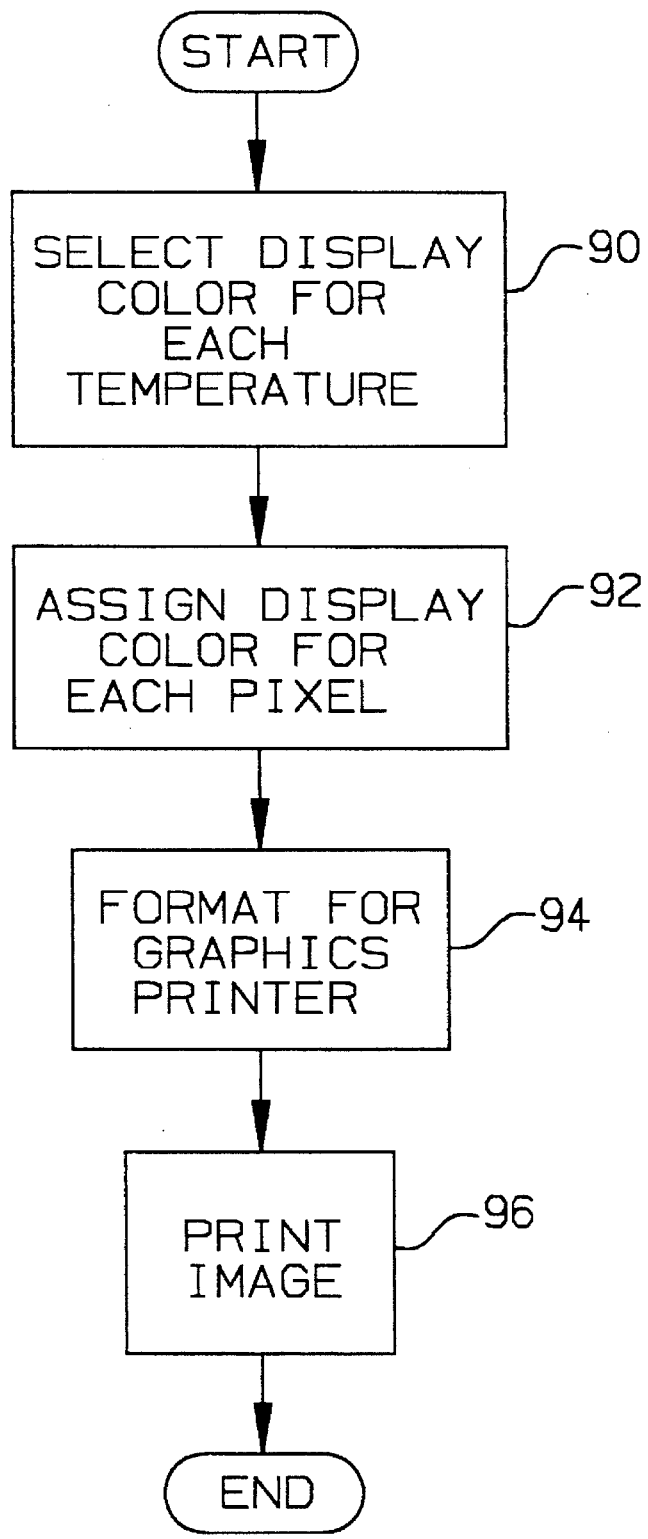
Fig_8_

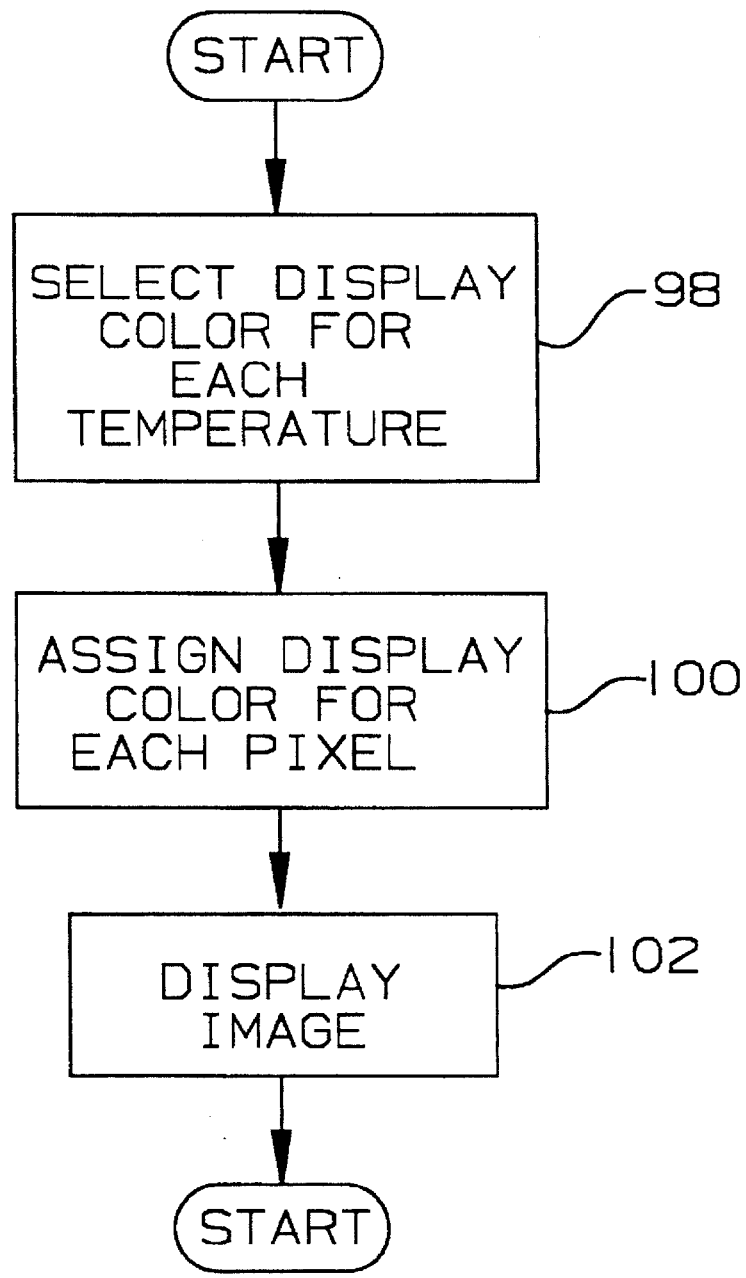

METHOD AND APPARATUS FOR PRODUCING A SURFACE TEMPERATURE MAP

TECHNICAL FIELD

This invention relates generally to a method and apparatus for providing a temperature map of a part operating within a machine, and more particularly to a method and apparatus for recognizing temperature induced color changes of a part operating within a machine.

BACKGROUND ART

For the last 20–30 years, temperature sensitive paints have proved useful in the development of high temperature turbine and combustion hardware. Thermal paints permanently change color when the test component on which they have been applied exceeds a predetermined temperature governed by the chemical composition of the paints themselves. By observation and analysis of the paint coloration pattern after a test run has been completed, it is possible to obtain a comprehensive map of the isotherms along the painted test pieces. Such paint is available for example from Thermindex Chemicals & Coatings LTD.

The painted components are assembled in a rig/engine prior to any testing and handled using clean nylon hand gloves to prevent contamination of the painted surfaces.

If the test part is part of a gas turbine engine, there should be no compressor wash or wet motor before the test run so that the painted surfaces remain uncontaminated. Whenever possible, engine light-up should be made using natural gas fuel. The fuel flow should be kept to a minimum during ignition to avoid turbine torching, and light-up should preferably occur on the first start. When a test run encompasses turbine nozzle and blade paint tests, the running time at full-load conditions should be achieved as quickly as possible and time spent at full load should not exceed 5 minutes to avoid paint removal by the scrubbing action of the exhaust gases. When paint testing heavy structures such as disks, diaphragms or casings, the running time should be 5 hours.

Combustor liners can undergo much longer exposure times without adverse effects. Color change calibrations for thermal paint are available up to some 50 hours exposure time although 30 minutes is the test norm. Estimates of temperature contours after a series of short "runs" even at nominally the same conditions can be misleading.

At the conclusion of a test run, the engine fuel should be cut-off at the maximum load conditions in order to reduce any effect of transient temperature exposure. The engine should then be motored at cranking speed for 15 minutes to cool the hot section parts. This procedure ensures that the heat lost by cooling at all locations is greater than the heat gained by transfer from the hotter to the cooler parts of any test section. If this precaution is disregarded, it may lead to a certain amount of heat-soaking and parts attaining a higher temperature during the cooling phase than they had reached during the test itself.

Thermal indicating paints change color in response to both time and temperature. In effect, this means when thermal paints are subjected at temperature to a time duration, the longer the time, the lower the temperature required to change the paint to the next color.

The painted objects should be brought to their operating temperatures as quickly as possible and conditions maintained constant for a period of time. The test time period is very important as it can be seen from the calibration charts above that the color change points vary with heating time.

Calibrated test strips should be taken from time to time to confirm the continuing calibration of the batch of paint acquired. Where possible, the test strips should be the same material and thickness as the engine component. Exposure time must be the same and allowances in paint calibrations should be made for differences in flow vitiation and the time taken for the test strip or tally to reach the working temperature in the laboratory.

FIG. 1 illustrates a fan blade from a gas turbine engine that has been painted with temperature sensitive paint and run in the gas turbine engine for a predetermined length of time. The illustrated areas indicate the different operating temperatures of the various areas of the fan blade in operation. As will be understood by those skilled in the art, accurate interpretation of the thermal paint pattern is an obvious prerequisite to the success of the manual measuring technique. Manual interpretation is subjective and requires an experienced operator who physically marks with a pencil the various color zones of a paint tested component with color boundary lines and then assigns quantitative values to each isothermal area. A single color in a series can span a temperature range of over 150° F., so it may be necessary to interpolate temperatures within a single color change.

The present invention is directed to overcoming one or more of the problems set forth above.

DISCLOSURE OF THE INVENTION

As described above, the manual interpretation of paint or material color change patterns is inherently subjective. The present invention provides an automatic interpretation system that has considerably more objectivity, is more productive, and provides improved color resolution. The automatic system identifies and produces a temperature map of a thermal painted surface or of the surface material of the part itself. The obtained temperature distribution data is also available to be linked to a structural analysis of the part.

In one aspect of the invention, a method is provided for producing a temperature map of a part having been painted with temperature sensitive paint. The method includes the steps of operating the machine with the part for a predetermined period of time; placing the part in a light controlled environment; producing an image of the part with a camera; delivering the image to a processor; comparing the image with a standard set of colors for the temperature sensitive paint; and selecting the standard color most closely corresponding to each pixel of the image.

In another aspect of the invention, a method for producing a temperature map of a part operating within a machine is provided. The method includes the steps of operating the machine with the part for a predetermined period of time; placing the part in a light controlled environment; producing an image of the part with a camera; delivering the image to a processor; comparing the image with a standard set of colors for the material of which the part is made; and selecting the standard color most closely corresponding to each pixel of the image.

In another aspect of the invention, an apparatus for producing a temperature map of a part operating within a machine is provided. The apparatus includes a camera for producing an image of the part; a light box containing the part and the camera; and a processor for receiving the image from the camera. The processor includes a memory storing a standard set of colors and compares the image with the standard set of colors to select the standard color most closely corresponding to each pixel of the image.

The invention also includes other features and advantages which will become apparent from a more detailed study of the drawings and specifications.

BRIEF DESCRIPTION OF THE DRAWINGS

For a better understanding of the present invention, reference may be made to the accompanying drawings, in which:

FIG. 1 illustrates a typical temperature map of a painted gas turbine fan blade after having been ran in a gas turbine;

FIG. 2 is a conceptual diagram of the invention;

FIG. 3 is a block diagram of an embodiment of the invention;

FIG. 4 is a diagrammatic illustration of a light box;

FIG. 5 illustrates a flow chart of an algorithm used in connection with one embodiment of the invention;

FIG. 6 illustrates a flow chart of an algorithm used in connection with one embodiment of the invention;

FIG. 7 illustrates a flow chart of an algorithm used in connection with one embodiment of the invention;

FIG. 8 illustrates a flow chart of an algorithm used in connection with one embodiment of the invention; and FIG. 9 illustrates a flow chart of an algorithm used in connection with one embodiment of the invention.

BEST MODE FOR CARRYING OUT THE INVENTION

FIG. 2 provides a conceptual view of an automated color recognition system 10. Conceptually, a video camera 12 first produces an image of each color in a standard set of colors. Each temperature sensitive paint has a different set of standard colors. Thus each time a new type of paint is to be used, the system must be taught the characteristics of each color in the standard set.

This is accomplished by placing a color template 14 in the field of view of the video camera 12. The color template 14 consists of painted pieces that have been baked at predefined temperatures for predefined periods of time to illustrate each of the colors in the standard set. Advantageously, the painted pieces are made of the same material forming the surface of the part 16 of interest. Using an exemplary paint, the color template would include each of the colors in the standard set for that particular paint type: red to dusty grey, yellow, orange, green, brown, and greenish grey.

It should be understood that other paint types will have different sets of standard colors. Similarly, most materials will themselves change colors even without being painted. In one embodiment of the invention, therefore, the set of standard colors are comprised of the colors of the material itself at different temperatures caused by thermal oxidation. Nonetheless, the invention will generally be described herein in connection with the use of temperature sensitive paint.

Once the images of the standard set of colors for the paint or material are obtained and stored, the part 16, which has been painted and run in the machine for a predetermined length of time, is placed in the field of view of the video camera 12. The video camera 12 produces an image of the part 16.

The video images of the color template 14 and the part 16 are digitized and processed to obtain characterizing features of each of the images. These characterizing features are compared and processed to produce a temperature profile or map of the part 16.

The temperature profile or map is advantageously displayed on a color or black and white monitor and may also be printed. The temperature profile may also be advantageously transferred to a structural analysis program in order to facilitate design changes necessitated by the characteristics of the temperature profile. It should be understood by those skilled in the art that the illustration in FIG. 2 is conceptual only and thus does not represent a true illustration of an actual preferred embodiment.

Turning now to FIG. 3, a block diagram of a preferred embodiment of the invention is shown. An IBM AT compatible (AST Bravo 486/25) computer 18 is included for analysis of the video images and control of the system. The computer 18 includes an imaging board for video digitization and display and is connected to a computer monitor 24. The video camera 12, for example a Sony XC-77 Monochrome, is connected to the computer 18. The video camera 12 is also connected to a video monitor 20 to aid in focusing and alignment of the parts and color templates in the field of view of the video camera 12. A color printer 22 is advantageously connected to the computer 18 to allow the temperature profiles of parts to be printed. A video recorder 26 is also connected to the computer 18 to allow the video images to be recorded for later use.

Turning now to FIG. 4, a light box 28 is shown. The light box 28 is preferably light tight and provides easy access to the video camera 12 and part 16. The inside of the light box 28 is preferably flat white. Advantageously, a light source (not shown) is provided and includes four, twenty-four inch, high output florescent lamps, daylight F40D. The power supply for the light source is high frequency and stabilized by photo feedback. Each of the lights are backed by reflectors and covered by diffusers. The light box 28 advantageously also includes inlet and outlet vents and a one-hundred CFM fan to dissipate heat from the lights. A fixture 34 is included to hold the part 16 in a fixed and stable position. The light box should be warmed-up for at least five minutes before starting video acquisition.

In one embodiment, a color wheel 30 includes four filters that are movable such that each can be placed between the lens of the video camera 12 and the part 16. The four filters are preferably Red #25, Green #85, Blue #47, and neutral. In one embodiment, the color wheel 30 is connected to the carriage of a dot-matrix computer printer 32 that receives commands from the computer 18 to move the carriage to positions at which the desired filter is located between the video camera lens and the part 16. Alternatively, a servo control of a type well-known in the art may be used in place of the computer printer 32 to move the color wheel to the desired position.

While the invention is described in connection with a black and white video camera 12 and a color wheel 30 having red, green, and blue filters, it should be appreciated that a color video camera may also be used without deviating from the invention. The use of a color camera would obviate the need for color filters.

The video camera 12 produces a video signal that is the same as the one used by a standard television. The image is produced by a rapid variation of voltage, where the higher voltage represents white and lower represents black. This signal also has periodic pulses that tell the monitor when to start the next line and the next picture. The picture starts with the first line on the top, and each line is scanned from left to right. This creates an image by a close raster of lines.

The imaging hardware takes the video signal from the video camera 12, adjusts the brightness and contrast of this signal and then converts it into a form that the computer 18 can read.

The brightness and contrast of the video signal can be controlled by adjusting the voltage saturation limits. These adjustments can be made by the computer and are called video low and video high. They are used to compensate for variations in image brightness and contrast. The video preamp low and high values affect the video signal before digitization. The range is 0 to 63. The two values specify the minimum and maximum levels to digitize the video signal. The standard setting is low=0 and high=48 to digitize the full range of a standard signal.

Next, the video signal is "digitized". This is the process that converts the signal from voltage fluctuation into a computer readable form. The digitizing process assigns the signal to a numeric value from 0 to 255. This value is called a "gray level", because it represents a brightness at a point on the image. The 0 value represents black, 255 represents white, other values are the intermediate levels of gray.

Each point on the image is represented by a number with a value from 0 to 255. These points (actually small squares) are called "pixels". The pixels are organized in computer memory as a matrix so they can be accessed in a way that represents an image. The pixels can be processed by the computer to enhance or analyze the image. To keep the references to the image consistent a convention is used: horizontal strips of pixels are called lines, horizontal pixel increments are called elements or just pixels, the top line is numbered 0, the left element is numbered 0, the bottom line is numbered 479 and the right element is numbered 639. This imaging system creates a digital image of 480 lines by 640 pixels, at total of 307,200 pixels.

Turning now to FIG. 5, the steps of an algorithm for characterizing the standard set of colors for a particular type of temperature sensitive paint is illustrated. It should be understood that this particular algorithm is used only when a new paint type is being characterized. This algorithm is unnecessary if the part to be studied has been painted with a paint type or is made of a material for which the characteristics of the standard set of colors are already known to the system.

The part 16 is moved into position and the zoom and focus of the video camera are adjusted as required. The aperture is advantageously set to f/4. The filter control is initialized at block 36 by having the computer 18 send a signal to the computer printer 32 causing the carriage to move to a position at which one of the filters of the color wheel 30 is located between the video camera 12 and the part 16. The imaging board registers are also initialized for the paint type to be calibrated. As described above, the video preamp low and high values are set.

In this example, the red filter is used first. The image produced by the video camera 12 with the red filter is recorded by the computer 18 at block 38. The computer printer 32 is then sent a signal from the computer 18 causing the color wheel to move the green filter to a position between the video camera 12 and the part 16. The image produced by the video camera 12 with the green filter is recorded by the computer 18 at block 40. Similarly, an image is obtained using the blue filter at blocks 42.

At block 46, the image obtained with the neutral filter is displayed on the computer monitor 24. To point to each color in the standard set to be "taught" to the system, the left mouse button of the computer 18 toggles between move and size modes to produce a measurement box that is placed over an area covering a particular color on the color template 14. The marked area defines a particular color in the standard set of colors and thus represents a particular temperature and time of exposure to that temperature.

The images for each of the filters are stored in memory along with the particular temperature assigned to that color. To further define the temperature classification, the average brightness and ratios of red-to-green and blue-to-green are calculated and stored with the other values defining that particular color/temperature. If another area defining a different color is to be characterized, then the procedures of blocks 48 and 50 are repeated until all of the colors in the standard set are characterized.

In an alternative embodiment, an image from the video camera is displayed on the computer monitor 24. The color wheel 30 is then moved to obtain readings for the marked area using each of the remaining filters. The average brightness and ratios of red-to-green and blue-to-green are then calculated for the marked area Once the calibration image has been obtained, the operation has three phases: image acquisition, image processing and image display.

The image acquisition algorithm for obtaining an image of the part 16 is shown in FIG. 6. The part 16 is moved into position and the zoom and focus of the video camera are adjusted as required. The aperture is advantageously set to f/4. At block 54, the imaging board registers are initialized and the memory is cleared to zero. As described above, the video preamp low and high values are set at block 56. The image to be obtained is named at block 58 by prompting the operator to enter a title for the image. The execution of blocks 60 through 72 is identical to the execution of blocks 36 through 42 in FIG. 5.

The algorithm used to classify the image of the part 16 is shown in FIG. 7. Each of the red, green, and blue images are calibrated at block 84 by multiplying the respective values by a gain and adding an offset value. The gain and offset values serve to bring all of the values to a normalized level.

To ensure proper results, the gain and offset must be recalibrated using a test piece having a black area and a white area. To perform the gain and offset calibration, the lens is set to f/4. The two gray level responses are then measured. The left mouse button will toggle between move and size modes for the measurement box. A marking box is placed on the dark side and a reading of the average brightness of the marked area is taken. The same is then completed for the light side. The process of measuring the average brightness of the dark and light areas is then repeated for the green and blue lenses. The gain and offset are then compensated to make the measured readings correspond to normalized values for the black and white areas of the test piece.

At block 86, the ratios of red-to-green and blue-to-green are calculated and multiplied by one-hundred. The average brightness is also calculated by adding the brightness of each of the red, green, and blue images together and dividing by three.

Each pixel is then classified in block 88 by minimizing the distance between the calculated values for the pixel and the calculated values for each of the colors in the standard set corresponding to the particular type of temperature sensitive paint being used. The difference between the calculated pixel values and those corresponding to each of the standard colors are calculated. As shown in the equation described in block 88, each of the difference values (for example $BRT - BRT_j$) is multiplied by a factor selected in response to the particular type of temperature sensitive paint. These factors are selected empirically through trial and error. The factors are made necessary since the color variations of some paints are most easily characterized by changes in the ratio of red-to-green; whereas others are most clearly distinguished by changes in brightness; still others may best characterized by changes in the ratio of blue-to-green; or varying combinations of the above. The distance function is then minimized to select one of the standard colors as most closely corresponding to the calculated values for each pixel.

In some instances, the image obtained will have small spots that do not add significant information regarding the temperature map of the part of interest. If the image has small spots, then a smooth operation may be selected by the operator to be performed before classification. Either 3×3, 5×5, or 7×7 smoothing may be selected. In the case of 3×3 smoothing, the value of the center pixel in each 3×3 block of pixels is set equal to the average of all nine pixels in the 3×3 area. The procedure for 5×5 and 7×7 smoothing is similar but with correspondingly larger areas being used.

Additional smoothing may also be performed after the image has been classified to remove any further small areas that do not add significant information to the temperature profile and contribute to a cluttered image. For example, if one or two pixels are surrounded with a different temperature classification, then these isolated pixels will be given the same temperature classification as the surrounding pixels. Greater smoothing can be provided by increasing the predefined size of the "islands" to be eliminated.

The flow charts for the algorithms used to print and display the classification images are shown in FIGS. 8 and 9, respectively. In block 90, a display color is assigned to each of the standard colors. In one embodiment, colors approximating the standard set of colors are used in the display. Such colorization is useful if the operator or other person performing the analysis is familiar with the particular type of paint being used.

Alternatively, each of the standard colors may be assigned one of the colors of the visible spectrum for ease of analysis. For example, the standard color greenish grey would be assigned the color red for display to indicate a relatively hot area, whereas the standard color red to dusty grey would be assigned the color violet for display to indicate a relatively cool area. Intermediate temperatures associated with the standard set of colors would be assigned intermediate colors in the visible spectrum, such as orange, yellow, green, and blue.

Each of the pixels that had previously been designated with one of the standard colors is assigned one of the display colors at block 92. The image is formatted for the graphics printer and the image is printed at blocks 94 and 96, respectively.

Turning now to FIG. 9, blocks 98 and 100 perform the functions described above in connection with blocks 90 and 92 in FIG. 8. The image is displayed on the computer monitor 24 at block 102.

INDUSTRIAL APPLICABILITY

The automated temperature sensitive paint recognition system is a custom computer vision system that acquires color image data from thermal paint experiments. The invention identifies and produces a map of temperatures of a part operating within a machine. The resulting image can be displayed or printed. This type of temperature profile study is particularly useful when performing blade diagnostic tests on production gas turbine engines. The present invention provides considerably more objectivity in interpreting colors as well as significantly better color resolution than a human eye. In addition, the resulting data file can also be used by other programs, such as structural analysis programs.

The system is programmable for different paint types and can even be used to analyze the natural color changes of any material submitted to extreme heat. In this case, the automatic color analyzer characterizes natural colors formed on components by thermal oxidation when run in hot environments. For this purpose, calibration of the standard set of colors to be equal to the natural metal colors is required.

Other aspects, objects, and advantages of this invention can be obtained from a study of the drawings, the disclosure, and the appended claims.

We claim:

1. A method for producing a temperature profile of a part operating within a machine, the part having been painted with temperature sensitive paint, comprising the steps of:

operating the machine with the part for a predetermined period of time;

placing the part in a light controlled environment;

producing an image of the part with a camera, the image including a plurality of pixels;

delivering the image to a processor;

comparing the image produced by the camera to a standard set of colors wherein said step of comparing the image with a standard set of colors includes the step of calculating a ratio of red-to-green colors corresponding to the colors present in the image, a ratio of blue-to-green colors corresponding to the colors present in the image, and a brightness level for the image and comparing the respective values for the image to the ratio of red-to-green colors, ratio of blue-to-green color, and brightness level for each of the standard colors for the temperature sensitive paint; and selecting the standard color most closely corresponding to each pixel of the image wherein said selected colors represent the temperature profile of the part.

2. A method, as set forth in claim 1, including the step of multiplying each of the values for the ratio of red-to-green, ratio of blue-to-green, and brightness level for the image by a corresponding factor selected in response to the type of temperature sensitive paint.

3. A method, as set forth in claim 2, including the step of calibrating the image by multiplying each pixel value by a gain value and adding an offset.

4. A method, as set forth in claim 1, including the steps of:

obtaining a color template for the type of temperature sensitive paint;

placing the color template in a light box;

producing a calibration image of at least one of the colors from the color template with the camera; and delivering the calibration image to the processor, wherein said step of selecting the standard color most closely corresponding to each pixel of the image includes the step of comparing each pixel of the image with the calibration image.

5. A method, as set forth in claim 1, including the step of displaying the temperature profile of the part in colors substantially corresponding to those in the standard set of colors.

6. A method, as set forth in claim 1, including the step of displaying the temperature profile of the part in colors substantially corresponding to the colors of the visible spectrum.

7. A method, as set forth in claim 1, including the steps of:

displaying the temperature profile of the part; and replacing areas of the temperature profile being less than a predefined size and corresponding to a temperature being substantially different from that of the surrounding area.

8. A method for producing a temperature profile of a part operating within a machine, comprising the steps of:

operating the machine with the part for a predetermined period of time;

placing the part in a light controlled environment;

producing an image of the part with a camera, the image including a plurality of pixels;

delivering the image to a processor;

comparing the image with a standard set of colors, wherein said step of comparing the image with a standard set of colors includes the step of calculating a ratio of red-to-green colors corresponding to the colors present in the image, a ratio of blue-to-green colors corresponding to the colors present in the image, and a brightness level for the image and comparing the respective values for the image to the ratio of red-to-green colors, ratio of blue-to-green colors, and brightness level for each of the standard colors for the material of which the part is made; and selecting the standard color most closely corresponding to each pixel of the image wherein said selected colors represent the temperature profile of the part.

9. A method, as set forth in claim 8, including the step of multiplying each of the values for the ratio of red-to-green, ratio of blue-to-green, and brightness level for the image by a factor corresponding to the material of which the part is made.

10. A method, as set forth in claim 9, including the step of calibrating the image by multiplying each pixel value by a gain value and adding an offset.

11. A method, as set forth in claim 8, including the step of displaying the temperature profile of the part in colors including at least one of red, orange, yellow, green, blue, and violet.

12. A method, as set forth in claim 8, including the steps of:

displaying the temperature profile of the part; and replacing areas of the temperature profile being less than a predefined size and corresponding to a temperature being substantially different from that of the surrounding area.

13. An apparatus for producing a temperature profile of a part operating within a machine, comprising:

a camera for producing an image of the part;

a light box containing the part and said camera;

a processor means for receiving said image of the part from said camera, said processor means including memory means for storing data characterizing a standard set of colors, means for comparing the image with said standard set of colors; and means for selecting the standard color most closely corresponding to each pixel of the image, wherein said selected colors represent the temperature profile of the part; and wherein said means for comparing the image with said standard set of colors includes means for calculating;

a ratio of red-to-green 8 colors corresponding to the colors present in the image a ratio of blue-to-green 9 colors corresponding to the colors present in the image, and a brightness level for the image and comparing the respective values for the image to the ratio of red-to-green colors, ratio of blue-to-green colors and brightness level for each of the standard color for the material of which the part is made.

14. An apparatus, as set forth in claim 13, wherein said processor means further includes a means for correlating the standard color to a temperature of the temperature profile.

15. An apparatus, as set forth in claim 13, including means for displaying the temperature profile of the part in colors including at least one of red, orange, yellow, green, blue, and violet.

16. An apparatus, as set forth in claim 13, including means for displaying the temperature profile of the part; and means for replacing areas of the temperature profile being less than a predefined size and corresponding to a temperature being substantially different from that of the surrounding area.

* * * * *